(12) United States Patent
Adolfse

(10) Patent No.: US 10,126,198 B2
(45) Date of Patent: Nov. 13, 2018

(54) HYDRAULIC PRESSURE CALIBRATOR AND CALIBRATION METHOD

(71) Applicants: Glind Metrology B.V., Amersfoort (NL); Qjuel Beheer B.V., Lemmer (NL)

(72) Inventor: Cornelis Gerardus Monulfus Adolfse, Amersfoort (NL)

(73) Assignees: Glind Metrology B.V., Amersfoort (NL); Qjuel Beheer B.V., Lemmer (NL)

(*) Notice: Subject to any disclaimer, the term of this patent is extended or adjusted under 35 U.S.C. 154(b) by 316 days.

(21) Appl. No.: 14/776,100

(22) PCT Filed: Mar. 14, 2014

(86) PCT No.: PCT/NL2014/050153
§ 371 (c)(1),
(2) Date: Sep. 14, 2015

(87) PCT Pub. No.: WO2014/142664
PCT Pub. Date: Sep. 18, 2014

(65) Prior Publication Data
US 2016/0033352 A1 Feb. 4, 2016

(30) Foreign Application Priority Data
Mar. 14, 2013 (NL) .................... 2010455

(51) Int. Cl.
G01L 27/00 (2006.01)
(52) U.S. Cl.
CPC ............ G01L 27/005 (2013.01); G01L 27/00 (2013.01)
(58) Field of Classification Search
CPC ................. G01L 27/005; G01L 27/00
See application file for complete search history.

(56) References Cited

U.S. PATENT DOCUMENTS

| 180,625 A | 8/1876 | Osborne |
| 2,954,041 A | 9/1960 | Gasche et al. |

(Continued)

FOREIGN PATENT DOCUMENTS

| CH | 406 667 | 1/1966 |
| DE | 1 173 694 | 7/1964 |

(Continued)

OTHER PUBLICATIONS

English Machine translation for document DE1173694.*

(Continued)

*Primary Examiner* — Daniel S Larkin
*Assistant Examiner* — Anthony W Megna Fuentes
(74) *Attorney, Agent, or Firm* — Pillsbury Winthrop Shaw Pittman, LLP

(57) ABSTRACT

The invention relates to a hydraulic pressure calibrator. The hydraulic pressure calibrator is a device for manipulating pressure of a hydraulic fluid in a controlled manner and can be used for calibration of pressure devices, such as hydraulic calibration and/or test applications. The calibrator comprises piping for accommodating a compressible hydraulic fluid to be pressurized. The piping has a connector for enabling a fluid connection to a device to be calibrated, such as a pressure standard. The calibrator further comprises a pressure transducer for sensing the pressure of hydraulic fluid inside the piping and a fluid pump for increasing pressure of hydraulic fluid inside the piping. Furthermore, the calibrator comprises an intensifier for intensifying fluid pressure provided by the pressure pump. In embodiments, the intensifier can have a piston assembly and the calibrator may further comprise a displacement transducer for sensing a change in position of said piston assembly.

15 Claims, 2 Drawing Sheets

(56) References Cited

U.S. PATENT DOCUMENTS

| | | | | | |
|---|---|---|---|---|---|
| 4,698,997 | A | * | 10/1987 | Hess | ................ G01L 27/005 73/1.64 |
| 6,178,759 | B1 | * | 1/2001 | Key | .................. F16K 17/16 137/68.19 |
| 2010/0101539 | A1 | * | 4/2010 | Meier | ............. F02M 59/102 123/508 |

FOREIGN PATENT DOCUMENTS

| | | |
|---|---|---|
| DE | 19 524 377 | 5/1996 |
| GB | 1 592 030 | 3/1978 |
| GB | 2 391 067 | 1/2004 |
| WO | WO 88/08966 | 11/1988 |

OTHER PUBLICATIONS

International Search Report dated Jul. 9, 2014 for Appln. No. PCT/NL2014/050153.
International Search Report dated Mar. 13, 2014 for Appln. No. NL 2010455.

* cited by examiner

HYDRAULIC PRESSURE CALIBRATOR AND CALIBRATION METHOD

CROSS REFERENCE TO RELATED APPLICATIONS

This application is the National Phase of PCT/NL2014/050153, filed Mar. 14, 2014, which claims priority to Netherlands Application No. 2010455, filed Mar. 14, 2013, the entire contents of both applications being incorporated herein by reference in their entireties.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION BY REFERENCE OF MATERIAL SUBMITTED ON A COMPACT DISC OR AS A TEXT FILE VIA THE OFFICE EFS-WEB

Not Applicable

STATEMENT REGARDING PRIOR DISCLOSURES BY THE INVENTOR OR JOINT INVENTOR

Not Applicable

BACKGROUND

Field of the Invention

The invention relates to hydraulic pressure calibrators.

Description of Related Art

A hydraulic pressure calibrator is a device for manipulating pressure of a hydraulic fluid in a controlled manner, for example to be used for calibration of pressure devices, such as hydraulic calibration and/or test applications.

Normally, a pressure controller comprises a pressure generator, often comprising a compressor such as a hydraulic pump, for instance an electro-hydraulic servo valve.

Available hydraulic pressure calibrators are often capable of handling pressures up to 1 or 1.5 kilobar. There are also hydraulic pressure calibrators known which can compress hydraulic fluids to realize pressure settings of up to 2 kilobar, so-called ultra-high pressure hydraulic pressure calibrators. However, such available hydraulic pressure calibrators are not capable handling pressures of about 4 or 5 kilobar.

It is noted that for instance in the automotive industry high pressure sensors are often used, for example in common rail direct fuel injection systems. Although such common rail systems normally use pressures of up to 1.8 or 2 kilobar higher pressures above 2 kilobar will be desired, for instance pressures of about 3, 4 or even 5 kilobar. Besides, also in other fields there is a tendency to apply higher and higher pressures. For example, in the field of petroleum extraction, higher and higher pressures are applied due to drilling deeper and deeper. However, there are no hydraulic pressure calibrators known that can realize pressure settings of up to about 4 or 5 kilobar or even higher, especially no calibrators are known capable of doing so in a fast and/or stable way. Therefore, calibrating pressure sensors for use in such relatively high pressure environments of for instance about 3, 4 or 5 kilobar is cumbersome and/or time consuming, if not almost impossible.

SUMMARY OF THE INVENTION

An object of the present disclosure is to provide an alternative hydraulic pressure calibrator and/or an alternative calibration method for calibrating a hydraulic device. It is an object of the present invention to alleviate or solve at least one of the disadvantages mentioned above. In particular, the invention aims at providing a hydraulic pressure calibrator which can realize a relatively high pressure, preferably a pressure of up to about 3, 4 or 5 kilobar or even higher. In embodiments, the present invention aims at providing a hydraulic pressure calibrator which can realize relatively high pressures in a controlled and/or fast and/or stable way.

In a first aspect the present invention provides for a hydraulic pressure calibrator, comprising piping for accommodating a compressible hydraulic fluid to be pressurised, said piping having a connector for enabling a fluid connection to a device to be calibrated, the calibrator further comprising a pressure transducer for sensing the pressure of hydraulic fluid inside the piping, and a fluid pump for increasing pressure of hydraulic fluid inside the piping, wherein the calibrator further comprises an intensifier for intensifying fluid pressure provided by the pressure pump.

By using the intensifier the fluid pressure provided by the pressure pump can be intensified. Therefore, a pressure can be realized which is higher than the maximum pressure the respective pressure pump is capable realizing directly. Consequently, because the pressure pump does thus not need to be capable of directly realizing the relatively high pressure, a relatively weak pressure pump, such as a low pressure hydraulic servo valve pump, can be used. Such a relatively weak pressure pump may be relatively stable and/or relatively fast and/or it can be counteracted that the pressure pump is working at or near the maximum of its capacity, where the pump is less stable. Hence, a relatively cheap, fast and/or stable pressure pump may be applied and/or a relatively high hydraulic fluid pressure can be realized in the piping in a controlled and/or fast and/or stable way.

The invention also relates to a calibration method for calibrating a hydraulic device, such as for instance but not limited to a pressure standard or a membrane based pressure sensor.

Advantageous embodiments according to the invention are described in the appended claims.

BRIEF DESCRIPTION OF THE DRAWINGS

By way of non-limiting example only, embodiments of the present invention will now be described with reference to the accompanying figures in which.

DETAILED DESCRIPTION OF THE INVENTION

The embodiments disclosed herein are shown as examples only and should by no means be understood as limiting the scope of the claimed invention in any way. In this description the same or similar elements have the same or similar reference signs.

In this description calibrating has to be understood as at least including but not necessarily limited to action for comparison between two measurements. A device can for instance be calibrated by just comparing its output with a known magnitude, such as a known pressure which can for instance be measured or sensed with a sensor with an assigned correctness.

In general terms the present invention can be understood as directed to a hydraulic pressure calibrator for realizing a relatively high fluid pressure in a hydraulic fluid, which is typically hydraulic oil, by compressing this fluid by for instance up to 50% of its initial volume, preferably about 20% to 50% of its initial volume.

In the present invention such compression can for example be realized by a first piston having a relative small pressure area, which first piston is drivable by a second piston having a relative large pressure area and being linked to said first piston. Since the second piston in such cases has a relatively large pressure area, only a relatively low pressure, provided by a pressure difference between both sides of the second piston, is needed to drive the first piston. Since the first and second piston are linked, a force corresponding to the force working on the second piston is working on the first piston. Due to the relative small pressure surface of said first piston, said corresponding force can realize a corresponding pressure in a first cylinder with the aid of which the hydraulic fluid is compressed, wherein said corresponding pressure can thus be higher than the pressure applied to the second piston in a second cylinder.

In this description words like substantially or about should be understood as meaning that a slight variation on or deviation from a value, an orientation or dimension or other product or method related feature is possible within the scope, at least such as would be understood by the skilled person. Such variation or deviation can for example be between 0% and 20%, more specifically between 0% and 15%, such as for example between 0% and 10% of the originally disclosed value or orientation of the like. By way of example this should be understood as meaning that for a direction an angular variation would be allowable, such as when directions are defined as being substantially parallel or substantially perpendicular, at least deviations thereof of less than 1, 2, 3, 8, or 14 degrees would be within the scope. However, it is apparent that such wording as about and substantially should be understood as meaning at least including the given value it refers to itself, thus without such variation.

Figure 1:
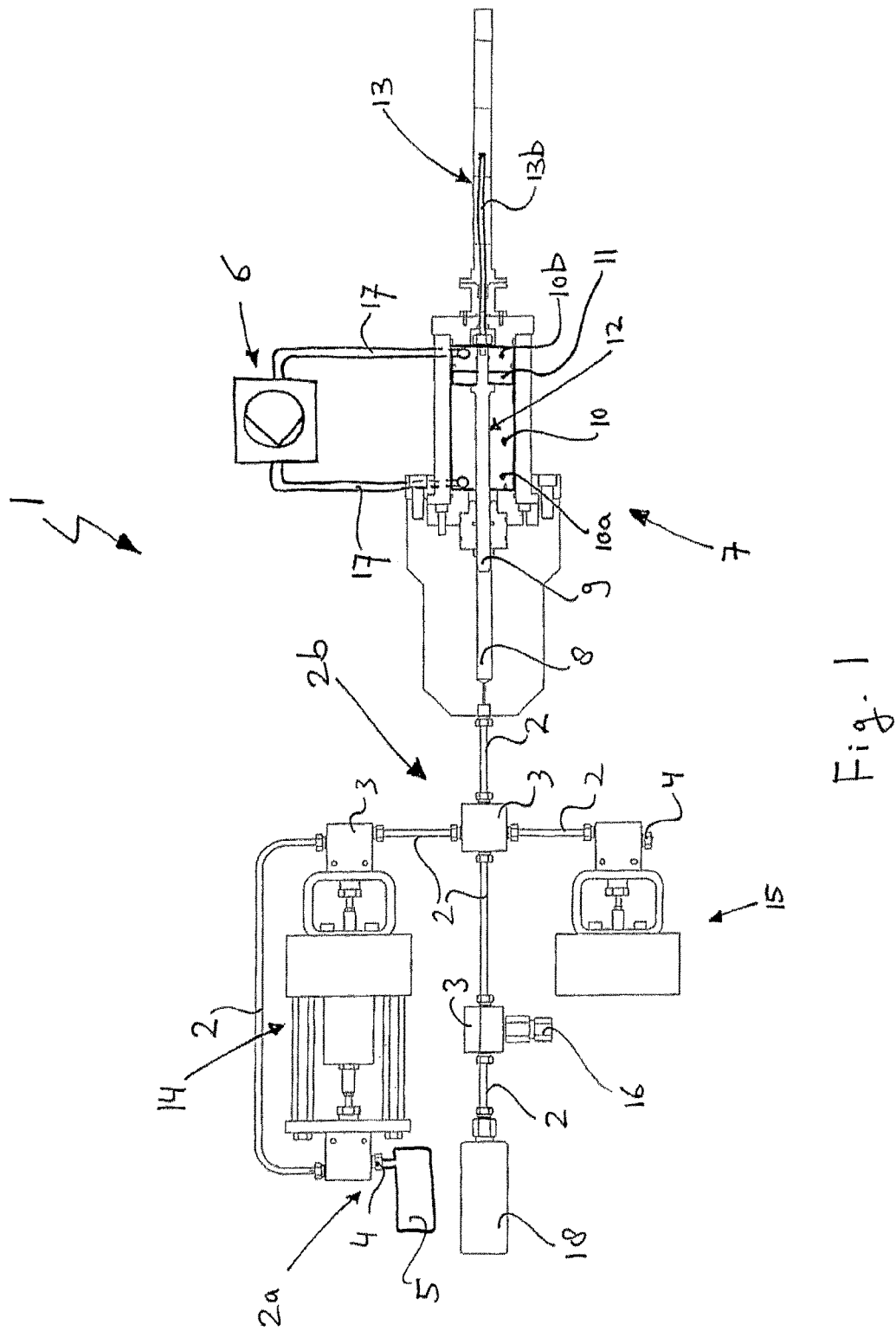
FIG. 1 shows a schematic view of a hydraulic pressure calibrator according to the invention.

FIG. 1 shows a schematic view of a first embodiment of a hydraulic pressure calibrator 1 according to the invention. The hydraulic pressure calibrator 1 comprises piping 2 for accommodating a compressible hydraulic fluid to be pressurised. Here, the piping 2 comprises multiple lines which can be interconnected, for instance by one or multiple connecting elements 3 such as a manifold. During use, the piping accommodates a compressible hydraulic fluid, preferably a liquid such as oil, especially a synthetic, mineral or natural oil, or mix thereof. However, any other suitable fluid can be applied alternatively, for instance water. The piping 2 has a connector 4 for enabling a fluid connection to a device 5 to be calibrated. Although the piping 2 of the embodiment shown in FIG. 1 has two connectors 4, the piping can alternatively have another number of connectors, such as for instance one, three, five or ten connectors. In the embodiment shown, one device 5 to be calibrated, or so-called unit under test 5, is connected to the piping 2. Here, said device 5 is a pressure sensor 5, such as a pressure sensor comprising a membrane. However, alternatively or additionally other hydraulic devices then membrane based sensors, may be connected to the piping 2 of the calibrator 1. As an example, such alternative device under test 5 can for instance be a primary pressure standard, such as a piston gauge or deadweight tester, which may need to be calibrated in order to use it as standard when calibrating other devices, for instance during field work. Further, the calibrator 1 comprises a pressure transducer 18 for sensing the pressure of hydraulic fluid inside the piping 2. Hence, during calibration the present pressure in the hydraulic fluid can be sensed, for instance in order to enable comparison between an assigned correct pressure magnitude sensed by the pressure transducer 18 and a pressure indicated by the device 5 to be calibrated. Further, the calibrator 1 comprises a fluid pump 6 for increasing pressure of hydraulic fluid inside the piping 2. Moreover, the calibrator 1 also comprises an intensifier 7 for intensifying fluid pressure provided by the pressure pump 6. As a result, a relatively high pressure can be realised in the fluid in the piping 2 by using a using a relatively low pressure pump. For example, the intensifier 7 may be arranged for intensifying a pressure realised by the fluid pump 6 in the range of 2 to 100 times, for instance between 5 and 70 times, preferably between 10 and 40 times, especially about 20 times.

It is noted that, during use of the calibrator 1, the piping 2 preferably forms part of a closed or closable circuit or system 2, 8, i.e. a so-called high pressure fluid circuit 2, 8. The piping 2 and/or said circuit or system should be substantially fluid tight during use in order to allow an increase of the pressure by compression of the hydraulic fluid. The closed or closable system or circuit may comprise the piping 2 and parts of the calibrator 1 that are in fluid connection with the piping 2, such as for instance a space of a pressure cylinder 8 which for instance may be part of the intensifier 7. Besides, said system of circuit may additionally or alternatively comprise other spaces, for instance a space in a device under test 5 and/or a space in a rupture disc 16 and/or other space in fluid connection with the piping 2.

The intensifier 7 of the embodiment shown has a first cylinder 8 in fluid connection to the piping 2. Said first cylinder, or so-called high pressure cylinder 8, houses a first piston 9, or so-called high pressure piston 9. The intensifier 7 further comprises a second cylinder 10, or so-called low pressure cylinder, which houses a second piston 11, or so-called low pressure piston 11. Said second piston 11 is linked, preferably mechanically, to the first piston 9 to form a piston assembly 12, or so-called intensifier piston assembly 12. As shown, the pistons 9, 11 can be linked in such a way that their respective stroke length and their respective force are the same. Thereto, they 9, 11 may for instance be linked by fixing them to or relative to each other. In such an embodiment, the force acting on the first piston 9 and the second piston 11 can be substantially inversely proportional to the effective working area of the respective piston. For instance, if the effective working area of the second piston 11 is about twentyfold the effective working area of the first piston 9, the pressure induced by the first piston 9 can be substantially twenty times the pressure applied to the second piston 11. Hence, the pressure can be intensified twentyfold. It is noted, however, that the pistons 9, 11 may, instead of being fixed in lateral direction, be linked in an alternative way. For example, the piston can be linked by means of a system of pivotably connected bars, which is arranged for moving the first piston 9 over a relatively short stroke by moving the second piston 11 over a relatively long stroke. As a result, the relative small pressure applied to the second piston 11 may be intensified such that the pressure induced by the first piston 9 may be larger than said relative small pressure applied to the second piston 11. It is noted that when the pistons 9, 11 are linked in such alternative way, the effective working area of the pistons 9, 11 in their respective cylinder 8, 10 can be substantially equal. However, said areas may also be different in order to further intensify or to damp the intensifying effect of the respective linking.

Preferably, the second piston 11 can be moved by means of the fluid pump 6. For example, the calibrator 1 can be arranged to allow the fluid pump 6 to change the pressure difference between two sides 10a, 10b of the second cylinder 11, each side located at an opposite side of the second piston 11. Thereto, the calibrator 1 can be arranged such that the fluid pump 6 can pump pressure fluid, preferably a hydraulic liquid, into and/or out of the second cylinder 10. Here, the calibrator 1 is arranged such that the fluid pump 6 can pump pressure fluid out of the second cylinder 10 at a first side 10a located at a first side of the second piston 11 and can pump pressure fluid into the second cylinder 10 at a second side 10b of the cylinder located at the opposite side of the second piston 11. However, alternative embodiments are possible. For example, the calibrator can be arranged such that the pump can pump pressure fluid into and out of the second cylinder 10 at only one side of the second piston 11. It is noted that the first side 10a and the second side 10b of the second cylinder 10 can be part of a single low pressure fluid circuit 10, 17, but may alternatively both 10a, 10b be part of two separate low pressure fluid circuits. Needless to say, said single or said separate low pressure fluid circuits 10, 17 is/are not or at least not directly in fluid connection with the high pressure fluid circuit 2, 8 accommodating the compressible hydraulic liquid.

In the embodiment shown, the fluid pump 6 is a hydraulic pump, such as for instance a hydraulic servo valve. However, the fluid pump 6 can be any suitable fluid pump, preferably a relative stable, fast and/or well controllable fluid pump. An example of an alternative pump 6 may be a variable-drive pump motor.

By using the intensifier for increasing the pressure, surprisingly pressures in the piping can be obtained of more than 200 N/mm$^2$, for example more than 300 N/mm$^2$ or even more than 400 N/mm$^2$ (1 kBar being about 100 N/mm$^2$) in a very accurate manner, increasing and decreasing pressures relatively evenly, without pressure waves, verifiably and reproducibly, which high pressures can relatively easily be controlled and maintained.

Further, the hydraulic pressure calibrator 1 can comprise a displacement sensor 13 for sensing the displacement of the first piston 9 and/or the displacement of the second piston 11. This is, the displacement sensor 13 can for instance be for sensing a change in position of the piston assembly 12. Preferably, said piston assembly 9, 11 comprises a displacement rod 13b, which may be at least partly protruding from the first and/or second cylinder and which can be mechanically linked to the first piston 9 and/or second piston 11, wherein the displacement sensor or so-called displacement transducer 13 is arranged for measuring a displacement of the rod 13b. Here, the first piston 9 and second piston 11 are fixed to each other such that the displacement of the first piston 9 is substantially similar, preferably equal, to the displacement of the second piston 11. The displacement rod 13b of the displacement sensor 13 is fixedly connected to the second piston 11. The displacement sensor 13 or so-called displacement transducer 13 can transduce a displacement, into an electric signal in order to directly sense the displacement of the first piston or to sense a displacement of another element. The displacement of such other element, for instance, the second piston, can correspond to a displacement of the first piston. Consequently, the displacement of the first piston can be calculated or measured accurately. Accurate information about the displacement of one or both of the pistons 9, 11, such as the first piston 9 can for instance be used to determine the present volume of the hydraulic liquid in the high pressure circuit 2, 8. Among others, such volume information can be used for calibration of a device 5 under test.

Additionally or alternatively, the calibrator 1 can comprise other sensors. For example, the calibrator 1 can comprise one or multiple temperature sensors and/or one or more additionally pressure sensors, for instance for measuring air pressure.

Figure 2:
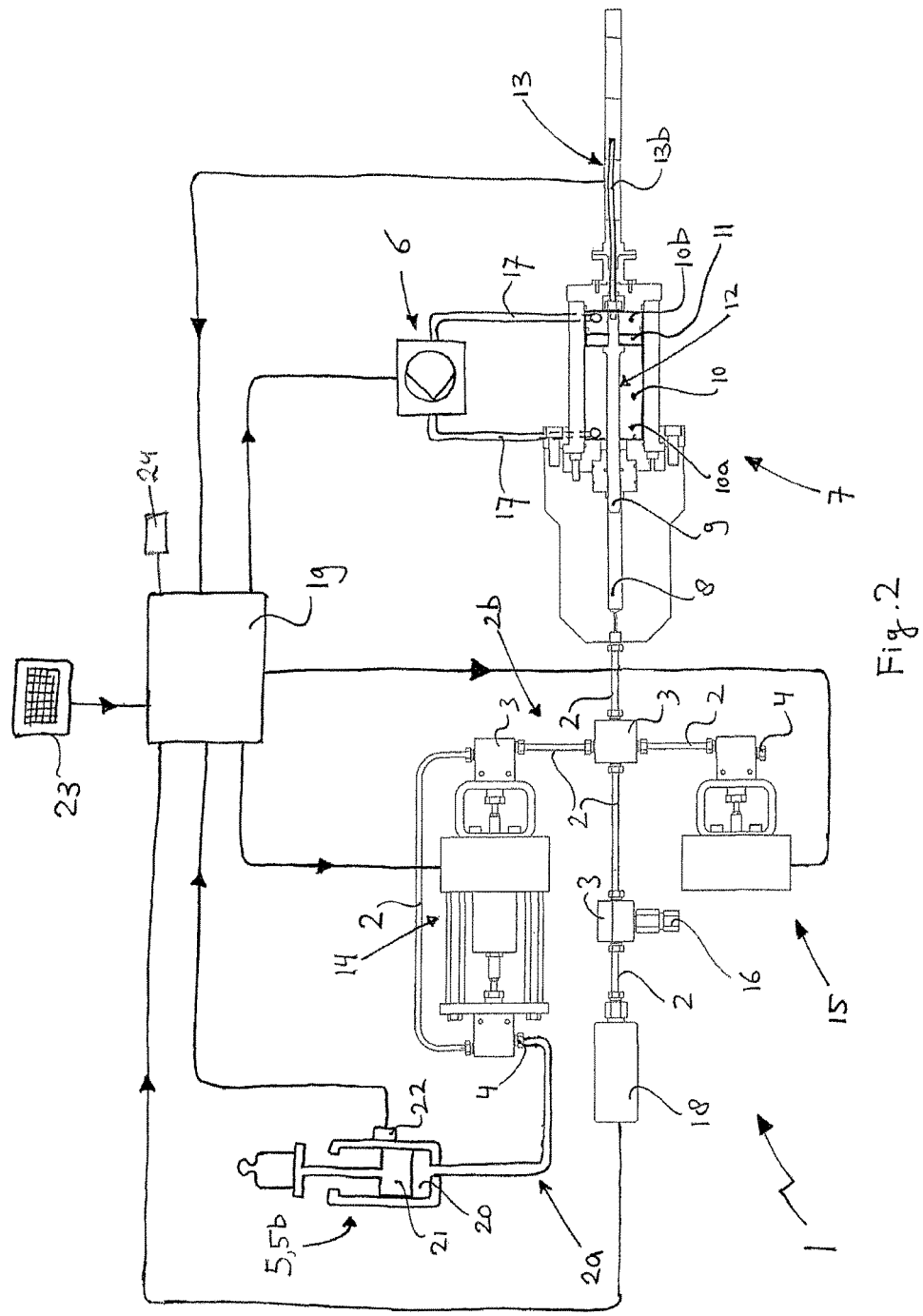
FIG. 2 shows a schematic view of a further embodiment of a hydraulic pressure calibrator according to the invention.

In the embodiments shown, the hydraulic pressure calibrator 1 can comprise an inlet valve 15 for introducing additional hydraulic fluid into the piping 2 and/or an outlet valve 15 for letting a surplus of hydraulic fluid out of the piping 2, preferably directly into or out of the piping 2. However, in alternative embodiments, the additional fluid may be introduced into the piping 2 or let out of the piping 2 through an inlet or outlet provided at an other part of the high pressure circuit 2, 8, such as an inlet or outlet provided at the high pressure cylinder 8. In the embodiments of FIGS. 1 and 2, the inlet valve 15 is a two-way valve 15 suitable for introducing additional hydraulic fluid into the piping as well as for letting a surplus of hydraulic fluid out of the piping 2.

In embodiments, the calibrator 1 may be arranged such that the additional fluid can be introduced during setting, especially during increasing, the hydraulic pressure in the piping 2. It is noted that in this context 'during' can for instance also include that the pressure increasing is temporarily paused in order to add extra hydraulic fluid and is resumed afterwards. For example thereto, the calibrator 1 can comprise an isolation valve 14 for isolating a first part 2a of the piping 2, which part 2a comprises the connector 4 for enabling a fluid connection to a device 5 to be calibrated, from a second part 2b of the piping 2, which part 2b comprises the inlet valve 15 and/or the outlet valve 15. Preferably, the isolation valve 14 is a constant volume valve 14 or so-called CV-valve 14, which is designed to be opened and/or closed without substantially displacing fluids. Hence, the isolation valve 14 formed by a constant volume valve 14 can thus be closed and/or opened without substantially increasing the pressure or generating a shock wave in the part 2a of the piping 2 comprising the connector 4. Consequently, harmful situations and/or damaging a pressure device 5 under test and/or the calibrator 1 itself due to opening and/or closing the isolation valve 14 can be counteracted. It is noted that constant volume valves are known and are for instance sold by the company Fluke Calibration.

It is noted that, for instance when the first piston 9 has reached its maximum stroke, the volume of the hydraulic liquid in the piping 2 and in spaces in fluid connection thereto can normally not be reduced any further. In order to increase said pressure, preferably without substantially increasing the temperature of said liquid, additional hydraulic liquid can be added. Before introducing said additional liquid, the isolation valve 14, such as a CV-valve, is preferably closed, such that the pressure built up in the first part 2a of the piping 2 can be maintained during introduction of the additional liquid. Subsequently, during and/or before introduction of the additional liquid via the inlet valve 15, the first piston 9 is preferably retracted at least partly, such that later on, after opening the isolation valve 14, the pressure in the piping 2 can be further increased by moving said piston 9 back forward inside the first cylinder 8. However, before the isolation valve 14 is opened, the inlet valve 15 is preferably closed. Subsequently, by means of moving the first piston 9, the pressure in the second part 2b can be brought to substantially the same pressure as the pressure in the first part 2a which is temporary isolated from said second part 2b.

It is noted that before closing the isolation valve 14, the pressure in the piping 2 can be sensed, for instance by means of a sensor 18. When the first piston 9 is subsequently not moved before the isolation valve 14 isolates the first part 2a, the pressure in said first part 2a will substantially maintain the sensed value. When after the adding of additional liquid the pressure in the second part 2b is brought to substantially the same pressure as the pressure in the isolated first part 2a, for instance the same sensor 18 can be used to sense the current pressure in the second part 2b.

Then sensed pressure data may for instance be compared with pressure data corresponding to the earlier sensed pressure in the piping 2, which due to the use of an isolation valve 14 can substantially correspond with said current pressure in the first part 2a. It is noted that the calibrator 1 can thereto for instance comprise a control unit 19, for instance for comparing said data and for controlling the first piston 9 by controlling the intensifier 7. Additionally or alternatively, the calibrator 1 can comprise a memory unit 24 for storing data, such as for instance the sensed pressure data.

Alternatively or additionally, the calibrator 1 can further comprise an further valve for letting a surplus of hydraulic fluid out of the piping 2 and/or for letting hydraulic fluid into the high pressure circuit, for instance to introduce hydraulic fluid into an empty piping 2 at a relative low pressure. Said further valve can for instance be useful in order to remove hydraulic fluid from the piping 2 relatively quickly with respect to a first inlet and/or outlet valve 15.

Furthermore, the hydraulic pressure calibrator 1 can be provided with a pressure relief unit 16, for instance a safety valve or a rupture disc 16. Therefore, excessive pressure inside the calibrator 1 can be counteracted, thereby counteracting harmful situations and/or damaging of the pressure device 5 to be calibrated and/or the calibrator 1 itself. Preferably, the pressure relief unit 16 is provided in the second part 2b of the piping 2.

Moreover, the invention also relates to a calibration method for calibrating a hydraulic device 5. For example, as shown in FIG. 2 which shows a schematic view of a further embodiment of a hydraulic pressure calibrator 1 according to the invention, the hydraulic device 5 can be a pressure standard 5b. However, alternatively another hydraulic device 5 may be calibrated with the method disclosed herein. Besides, it is noted that although one hydraulic device 5 is calibrated here, in embodiments of the invention multiple hydraulic devices may be calibrated at least partly simultaneously.

The method comprises a step of connecting a device 5 to be calibrated to a piping 2 for accommodating a compressible hydraulic fluid, for instance by connecting said device 5 to a connector 4 provided to the piping 2. Here, the connection is liquid tight, at least at pressures used during calibration. Preferably, the piping 2 is part of a calibrator 1, for instance a calibrator 1 such as described above. Besides, the connection is preferably made such that after connecting the device 5, a closed system or circuit is formed. This is, the piping for accommodating the compressible hydraulic fluid and spaces in fluid connection therewith, such as for instance a space in a cylinder 8 connected to the piping 2 and a space in the device 5 to be calibrated, may together form a substantially closed high pressure system or substantially closed high pressure fluid circuit.

In embodiments, the method may comprise the step of introducing the hydraulic fluid into the substantially closed system, preferably into the piping 2. For example, the fluid may be introduced through an inlet valve 15, preferably a combined inlet-outlet valve. The hydraulic fluid can at least partly be introduced after connecting the device 5 to the piping 2, but may alternatively or additionally be introduced at least partly before the device under test 5 is connected. In embodiments, after connecting said hydraulic device 5, additional hydraulic fluid can be introduced into a high pressure circuit already housing some hydraulic fluid.

The method further comprises the step of increasing the pressure of the hydraulic fluid inside the piping 2, and thus inside the high pressure circuit or system 2, 8. The pressure is increased by compressing the fluid by means of moving a first piston 9 housed inside a first cylinder 8, due to that in this way the volume occupied by the high pressure hydraulic fluid can be decreased, because there is less space left for it in the first cylinder 8. The first piston 9 is moved by means of moving a second piston 11, linked to the first piston 9 and housed inside a second cylinder 10, by changing the difference in pressure between two sides 10a, 10b of the second piston 11. The two pistons 9, 11 are linked such that a movement of the second piston 11 over a certain distance will cause the first piston 9 to move over a corresponding distance. In the embodiments shown here, said pistons 9, 11 are linked such that the correspondence between said distances is substantially 1:1. This can for instance be achieved by fixing the pistons 9, 11 relative to or relative to each other. Hence, the transmission ratio between the movements of the pistons 9, 11 is here substantially linear. However, in alternative embodiments said ratio may be non-linear and/or may be larger or smaller than 1:1, for instance to intensify the force working on the second piston 11.

In advantageous embodiments, like in the embodiment shown in FIG. 2, the difference in pressure between the two sides 10a, 10b of the second piston 11 is changed by means of a fluid pump 6. The first piston 9 can be moved with a relatively high force by means of a fluid pump 6 which itself cannot directly provide such a high force. In order to increase the pressure in the piping 2 and thus the pressure working on the device 5 to be calibrated, at least a part of the pressure fluid can be removed from a space 10a of the second cylinder 10 at a first side 10a of the piston 11 and/or additional pressure fluid can be introduced into a space 10b of the second cylinder 10 at a second side 10b of the piston 11. Here, both spaces can be part of a single low pressure circuit 10a, 17, 10b, wherein e.g. spaces 10a, 10b are connected to a single fluid pump 6, which can pump fluid from one side 10a of the cylinder to the other side 10b. However, in alternative embodiments only the amount of liquid in one of the spaces 10a, 10h may be changeable and/or the amount of liquid in each of both spaces 10a, 10b may be changeable irrespectively of the other space 10b, 10a. For instance, each space 10a, 10b can be connected to its own pump 6, by means of separate pressure liquid lines 17 and/or separate low pressure circuits.

Additionally, the method of the invention may in embodiments comprise the step of measuring or sensing the pressure of the fluid pressure inside the piping 2, for instance by means of a pressure transducer 18. Data about the sensed present pressure may subsequently be used to control the pressure increase and to decide to increase the pressure of the hydraulic fluid inside the piping 2 further. In embodiments, this may be done manually. However, the calibrator 1 may comprise a control unit 19, preferably a high accuracy pressure control unit, which can be connected to the pressure transducer 18 in order to obtain data about the pressure in the piping 2 and/or the high pressure circuit 2, 8. The control unit 19 can also be arranged to control the intensifier 7, preferably by controlling the pump 6 or a multiple number of pumps to move the second piston 11 and thereby changing the position of the first piston 9. Thereto, the control unit 19 can be connected to the intensifier 7, preferably to the fluid pump 6 or the multiple pumps. As a result, the calibrator may be arranged for automated and/or semi-automated calibration of pressure devices 5. Alternatively or additionally, the control unit 19 may be arranged to obtain other data, for example data about a temperature of the hydraulic fluid in the high pressure circuit sensed by a temperature sensor and/or data relating to the volume of the pressurised space inside the high pressure circuit, such as data from the displacement sensor 13, and/or data generated by the hydraulic device 5 to be calibrated. Besides, the control unit 19 can alternatively or additionally be arranged to control other parts of the calibrator 1, such as an inlet valve 15, an isolation valve 14, a heater and/or a cooler, and/or for obtaining further or other data, such as from the low pressure circuit.

In the embodiment of FIG. 2, the hydraulic device 5 to be calibrated show schematically as a pressure standard 5b. The pressure standard 5b comprises a third cylinder 20 in which a third piston 21 is placed. A weight is placed on the third piston 21 and the side of the cylinder 20 below the piston 21 has been brought in fluid connection with the piping 2. When increasing the pressure of the hydraulic fluid in the piping 2, at a certain pressure the third piston 21 will be elevated by the hydraulic fluid in the high pressure circuit 8, 2, 20. In order to calibrate the pressure standard 5b, the present pressure of the hydraulic fluid in the piping 2 should be known at the moment the third piston floats in the cylinder 20. This can for instance be sensed by a pressure transducer 18. Besides, the displacement sensor 13 may give data regarding the volume of the pressurised hydraulic fluid in the high pressure circuit 8, 2, 20. Preferably, this data is provided as feedback to the control unit 19. The control unit 19 may additionally be arranged to receive feedback from one or more other sensors. For example, such other sensor may be a displacement sensor 22 for providing data about the third piston 21, for example about its relative movement and/or whether it is floating and/or data regarding the volume of the part of the third cylinder 20 occupied by the pressurised hydraulic fluid. As another example, an air pressure sensor can be provided, preferably as part of the calibrator 1 and more preferably located in the vicinity of at least one connector 4 for connecting the device 5 to be calibrated.

Additionally or alternatively, the calibrator 1 may comprise one or more input devices 23, such as a touch screen, key board and/or buttons, to allow a user to provide input to the control unit 19. Besides, the control unit 19 may additionally or alternatively be connected to a memory unit 24 which can comprise a database with data, such as for example preferred pressure limits, which can relate to specific devices 5 to be calibrated.

In advantageous embodiments, the control unit 19 is arranged for controlling parts of the calibrator 1 such as at least one respective pump 6 and/or valve 14, 15, preferably at least partly based on data provided by one of the above mentioned sensors and/or other sensors, input from a user of the calibrator 1 and/or data provided by a database.

Moreover, the method can comprise the step of adding additional hydraulic fluid to the high pressure circuit, for example in order to enable further pressure increase after the first piston 9 has reached its maximum stroke. For instance, the additional fluid can be added to the piping 2 by means of the inlet valve 15, which can be connected to a reservoir (not shown) for hydraulic fluid. Preferably, the first piston 9 is retracted during the adding of said additional fluid. As a consequence, the hydraulic fluid in the high pressure circuit or system can subsequently be further increased by moving said first piston 9 forwards into the first cylinder 8.

Additionally, the method may comprise the step of isolating a first part 2a of the piping 2, which part 2a comprises the connector 4 for enabling a fluid connection to a device 5 to be calibrated, from a second part 2b of the piping 2, which part 2b comprises the inlet valve 15. Preferably, said step comprises closing an isolation valve 14 in order to isolate the respective parts 2a, 2b from each other. Consequently, the pressure in the first part 2a can be substantially maintained during adding the additional hydraulic fluid to the high pressure circuit, when said fluid is added to the second part 2b.

The method may additionally comprise a step of bringing the pressure in the second part 2b to substantially the same extent as that of the pressure prevailing in the isolated first part 2a. Further, the method may comprise the step of subsequently opening the isolation valve 14, preferably being a constant volume valve 14. Moreover, the method may comprise a subsequent step of further increasing the pressure of the hydraulic fluid inside the piping 2.

Additionally or alternatively, the method may comprise other steps, which may be performed at least partly during and/or at least partly before or after at least one of the above mentioned steps. For example, the pressure in the piping 2 may be reduced and/or at least a part of the hydraulic fluid may be removed from the high pressure circuit 2, 8, for instance before removing the device 5 under test from the connector 4.

The invention is not restricted to the embodiments described above. It will be understood that many variants are possible.

For example, the hydraulic pressure calibrator can comprise more than one intensifier, for instance two intensifiers, parallel and/or in series. The or each intensifier can be provided with another drive mechanism instead of or in combination with the second piston-cylinder system 10, 11, such as for example but not limited to a motor, especially a linear motor unit, pneumatic drives or similar means. Multiple pumps can be used for operating the intensifier or intensifiers.

These and other embodiments will be apparent to the person skilled in the art and are considered to be lie within the scope of the invention as formulated in the following claims.

The invention claimed is:

1. A hydraulic pressure calibrator, comprising piping for accommodating a compressible hydraulic fluid to be pressurized, said piping having a connector for enabling a fluid connection to a device to be calibrated,
   the calibrator further comprising a pressure transducer for sensing pressure of hydraulic fluid inside the piping, and a fluid pump for increasing pressure of hydraulic fluid inside the piping,
   wherein the calibrator further comprises an intensifier for intensifying fluid pressure provided by the fluid pump, wherein the intensifier has a first cylinder housing a first piston and a second cylinder housing a second piston linked to the first piston to form a piston assembly, wherein the first cylinder is in fluid connection to the piping, and wherein the second piston is moved by means of the fluid pump, further comprising a displacement sensor for sensing displacement of the first piston and/or second piston, further comprising an inlet valve for introducing additional hydraulic fluid into the piping and/or an outlet valve for letting a surplus of hydraulic fluid out of the piping, and further comprising an isolation valve for isolating a part of the piping comprising the connector for enabling a fluid connection to the device to be calibrated from a part of the piping comprising the inlet valve and/or the outlet valve, wherein the isolation valve and the displacement sensor are connected to a control unit arranged for controlling the intensifier and obtaining data including data from the displacement sensor and controlling the isolation valve based on the data from the displacement sensor.

2. The hydraulic pressure calibrator according to claim 1, wherein the calibrator is arranged such that the fluid pump can pump pressure fluid into and/or out of the second cylinder in order to drive the second piston and hence the linked first piston as well.

3. The hydraulic pressure calibrator according to claim 1, wherein said fluid to be pressurized is a hydraulic liquid and the fluid pump is a hydraulic pump.

4. The hydraulic pressure calibrator according to claim 3, wherein the fluid pump comprises a positive displacement pump and/or a hydraulic servo valve.

5. The hydraulic pressure calibrator according to claim 1, wherein the piston assembly further comprises a displacement rod at least partly protruding from first and/or second cylinder and being mechanically linked to the first piston and/or second piston, wherein the displacement sensor is arranged for measuring displacement of the rod.

6. The hydraulic pressure calibrator according to claim 1, wherein the inlet valve is a two-way valve suitable for introducing additional hydraulic fluid into the piping and suitable for letting a surplus of hydraulic fluid out of the piping.

7. The hydraulic pressure calibrator according to claim 1, wherein the piping is provided with a pressure relief unit in the form of a rupture disc.

8. The hydraulic pressure calibrator according to claim 1, wherein the pump and intensifier are designed for providing a pressure inside the piping of more than 2 kilobar absolute (200 N/mm$^2$).

9. The hydraulic pressure calibrator according to claim 8, wherein the pressure provided by the pump and intensifier is more than 3 kilobar (300 N/mm$^2$).

10. The hydraulic pressure calibrator according to claim 9, wherein the pressure provided by the pump and intensifier is more than 4 kilobar (400 N/mm$^2$).

11. The hydraulic pressure calibrator according to claim 1, wherein the isolation valve is a constant volume valve.

12. A calibration method for calibrating a hydraulic device, such as a pressure standard, comprising the steps of:
connecting a device to be calibrated to a piping for accommodating a compressible hydraulic fluid;
increasing pressure of a hydraulic fluid inside the piping by compressing the fluid by means of moving a first piston housed inside a first cylinder, wherein the first piston is moved by means of moving a second piston, linked to the first piston and housed inside a second cylinder, by changing a difference in pressure between two sides of the second piston; and
calibrating the device,
wherein displacement of the first and/or second piston is sensed using a displacement sensor,
wherein, based on a sensed displacement of the first and/or second piston, an isolation valve is controlled, isolating a part of the piping comprising a connector for enabling a fluid connection to a device to be calibrated from a part of the piping comprising an inlet valve and/or an outlet valve, wherein hydraulic liquid is introduced into and/or removed from said part of the piping comprising the inlet valve and/or the outlet valve when said part is isolated from the part of the piping comprising the connector for enabling a fluid connection to a device to be calibrated.

13. The method according to claim 12, wherein the difference in pressure between the two sides of the second piston inside the second cylinder is changed by means of a fluid pump.

14. The method according to claim 12, wherein the isolation valve is controlled by a control unit connected to the displacement sensor based on data obtained from said displacement sensor.

15. A hydraulic pressure calibrator, comprising piping for accommodating a hydraulic fluid to be pressurized, said piping having a connector for enabling a fluid connection to a device to be calibrated,
the calibrator further comprising a pressure transducer for sensing pressure of hydraulic fluid inside the piping, and a fluid pump for increasing pressure of hydraulic fluid inside the piping,
wherein the calibrator further comprises an intensifier for intensifying fluid pressure provided by the fluid pump, wherein the intensifier has a first cylinder housing a first piston and a second cylinder housing a second piston linked to the first piston to form a piston assembly, wherein the first cylinder is in fluid connection to the piping, and wherein the second piston is moved by means of the fluid pump,
further comprising a displacement sensor for sensing displacement of the first piston and/or second piston,
further comprising an inlet valve for introducing additional hydraulic fluid into the piping and/or an outlet valve for letting a surplus of hydraulic fluid out of the piping, and
further comprising an isolation valve for isolating a part of the piping comprising the connector for enabling a fluid connection to the device to be calibrated from a part of the piping comprising the inlet valve and/or the outlet valve,
wherein the isolation valve and the displacement sensor are connected to a control unit arranged for controlling the intensifier and obtaining data including data from the displacement sensor and controlling the isolation valve based on the data from the displacement sensor.

* * * * *